US009208728B2

(12) United States Patent
Kim et al.

(10) Patent No.: US 9,208,728 B2
(45) Date of Patent: Dec. 8, 2015

(54) DISPLAY APPARATUS WITH BACKLIGHT DRIVING CIRCUIT AND CONTROL METHOD THEREOF

(75) Inventors: Tae-sung Kim, Suwon-si (KR); Yong-joo Lee, Incheon (KR); Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 413 days.

(21) Appl. No.: 13/244,307

(22) Filed: Sep. 24, 2011

(65) Prior Publication Data

US 2012/0162279 A1 Jun. 28, 2012

(30) Foreign Application Priority Data

Dec. 23, 2010 (KR) ........................ 10-2010-0133556

(51) Int. Cl.

| | |
|---|---|
| ***G06F 3/038*** | (2013.01) |
| ***G09G 5/00*** | (2006.01) |
| ***G09G 3/36*** | (2006.01) |
| ***G09G 3/34*** | (2006.01) |

(52) U.S. Cl.

CPC .......... *G09G 3/3406* (2013.01); *G09G 2330/04* (2013.01)

(58) Field of Classification Search

CPC .. Y02B 20/341; Y02B 20/346; Y02B 20/347; G09G 3/3406; G09G 2320/064; G09G 2320/04; G09G 3/006; G09G 2330/08; G09G 2330/12; H05B 41/285–41/2858

USPC .................. 345/690, 204, 211–213, 87–104; 362/97.1–97.2

See application file for complete search history.

(56) References Cited

U.S. PATENT DOCUMENTS

| | | | | |
|---|---|---|---|---|
| 6,462,601 | B1 * | 10/2002 | Chang et al. | 327/313 |
| 8,339,063 | B2 * | 12/2012 | Yan et al. | 315/291 |
| 2007/0188112 | A1 * | 8/2007 | Kang et al. | 315/291 |
| 2007/0222739 | A1 * | 9/2007 | Yu et al. | 345/102 |
| 2007/0285380 | A1 * | 12/2007 | Jun | 345/102 |
| 2008/0211418 | A1 * | 9/2008 | Lu | 315/210 |
| 2009/0066374 | A1 * | 3/2009 | Nagumo | 327/109 |
| 2009/0190065 | A1 * | 7/2009 | Konno et al. | 349/61 |
| 2009/0225021 | A1 * | 9/2009 | Ye et al. | 345/102 |
| 2010/0141163 | A1 * | 6/2010 | Ye et al. | 315/189 |
| 2011/0037399 | A1 * | 2/2011 | Hung et al. | 315/219 |

* cited by examiner

*Primary Examiner* — Amr Awad
*Assistant Examiner* — Roberto Flores
(74) *Attorney, Agent, or Firm* — Sughrue Mion, PLLC

(57) ABSTRACT

A display apparatus and a control method thereof are disclosed. The display apparatus includes a signal processor which processes a video signal; a display which displays an image based on the video signal processed by the signal processor, a light source providing light for displaying the image; and a driving circuit which drives the light source on the basis of a dimming signal having an on-section and an off-section for dimming the light source. The driving circuit includes a protection circuit for performing a protection operation as a result of an abnormal electric current flowing in the light source during the off-section. The display apparatus is protected when a short circuit occurs between the light source and the driving circuit, thereby enhancing the stability and reliability of the apparatus.

15 Claims, 13 Drawing Sheets

DISPLAY APPARATUS WITH BACKLIGHT DRIVING CIRCUIT AND CONTROL METHOD THEREOF

CROSS-REFERENCE TO RELATED APPLICATION

This application claims priority from Korean Patent Application No. 10-2010-0133556, filed on Dec. 23, 2010 in the Korean Intellectual Property Office, the disclosure of which is incorporated herein by reference.

BACKGROUND

1. Field

Apparatuses and methods consistent with the exemplary embodiments relate to a display apparatus and a control method thereof. More particularly, the apparatuses and methods of the exemplary embodiments relate to a display apparatus provided with a driving circuit for driving a backlight for displaying an image, and a control method thereof.

2. Description of the Related Art

A display apparatus such as a liquid crystal display (LCD) TV, a monitor, etc. includes a light source unit to provide light to a display panel such as an LCD panel, etc., (hereinafter, referred to as a "panel") for displaying an image based on a video signal, in which the light source unit may employ a light emitting diode (LED), etc. as a "backlight." The display apparatus includes a driving circuit to drive such a light source unit.

The light source unit may be provided in the display apparatus in various forms according to a required quantity of light or the size of a screen. For example, the light source unit may be provided as a bar-shaped module including a plurality of LEDs (hereafter, referred to as an "LED module") installed in a part or in all four sides of a light guide plate, for guiding light. Each LED module installed inside the panel is connected through a wire to a driving circuit which is provided outside the panel. The driving circuit detects an electric current flowing in the LED module (hereafter, referred to as an "LED current") and controls the LED current to reach a target current level.

However, for example, if the LED module, a wire for connecting the driving circuit, a part of a printed circuit board (PCB) pattern of the LED module, etc. is accidentally connected to a ground of the driving circuit and short-circuited in a panel fabricating process, etc., the driving circuit cannot control the LED current properly. In this situation, generation of heat, failure of parts, etc., may occur in the driving circuit, the LED module, etc.

SUMMARY

Accordingly, one or more exemplary embodiments provide a display apparatus and a control method thereof, in which the display apparatus is protected when a short circuit occurs in a light source unit and a driving circuit, thereby enhancing the stability and reliability of the display apparatus.

The foregoing and/or other aspects may be achieved by providing a display apparatus including: a signal processor which processes a video signal; a display unit which displays an image based on the video signal processed by the signal processor, the display unit includes a light source unit providing light for displaying the image; and a driving circuit unit which drives the light source unit on the basis of a dimming signal having an on-section and an off-section, for dimming the light source unit, the driving circuit unit including a protection circuit unit for performing a protection operation as a result of an abnormal electric current flowing in the light source unit during an off-section.

The protection circuit unit may include a detection device connected between an input side ground and an output side ground of the driving circuit unit. The protection circuit unit detects an electric current flowing in the light source unit. The detection device may include a diode.

The protection circuit unit may further include a protection device connected in parallel with the detection device. The detection device may include a resistor.

The protection circuit unit may further include a switching device connected in parallel to the detection device and switching, so as not to make an electric current flow in the detection device during an on-section.

The display apparatus may further include a dimming signal output unit which outputs the dimming signal on the basis of at least one detection signal for detecting overvoltage/overcurrent situations of the driving circuit unit.

The protection circuit unit may perform the protection operation as a result of an abnormal electric current flowing in the driving circuit unit is abnormal during the on-section.

The protecting operation may include shutting off power to the display apparatus.

Another aspect of the exemplary embodiments may be achieved by providing a method of controlling a display apparatus including a light source unit providing light for displaying an image, the method including: driving the light source unit on the basis of a dimming signal having an on-section and an off-section for dimming the light source unit; and performing a protection operation as a result of an abnormal electric current flowing in the light source unit during the off-section.

The performing of the protection operation may include switching so as not to make an electric current flow in a resistor for detecting an electric current flowing in the detection device during the on-section.

The method may further include outputting the dimming signal on the basis of at least one detection signal for detecting overvoltage/overcurrent situations of a circuit for driving the light source unit.

The method may further include performing the protection operation as a result of an abnormal electric current flowing in the driving circuit unit during the on-section.

Still another aspect may be achieved by providing a display apparatus including: a signal processor which processes a video signal; a display unit which displays an image based on the video signal processed by the signal processor, the display unit includes a light source unit providing light for displaying the image; a driving circuit unit which drives the light source unit on the basis of a dimming signal having an on-section and an off-section for dimming the light source unit; and a protection circuit unit which connects an input side ground and an output side ground of the driving circuit unit during the on-section, and disconnects the input side ground and the output side ground of the driving circuit unit during the off-section.

The protection circuit unit may perform a protection operation as a result of an abnormal electric current flowing in the driving circuit unit during the on-section.

The display apparatus may further include a dimming signal output unit which outputs the dimming signal on the basis of at least one detection signal for detecting overvoltage/overcurrent situations of the driving circuit unit.

Yet another aspect may be achieved by providing a method of controlling a display apparatus including a light source unit providing light for displaying an image, the method including: driving the light source unit on the basis of a dimming signal having an on-section and an off-section for dimming the light source unit; connecting an input side ground and an output side ground of a circuit for driving the light source unit during the on-section, and disconnecting the input side ground and the output side ground of the circuit during the off-section.

The method may further include outputting the dimming signal on the basis of at least one detection signal for detecting overvoltage/overcurrent situations of the circuit for driving the light source unit.

The method may further include performing a protection operation as a result of an abnormal electric current flowing in the circuit during the on-section.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
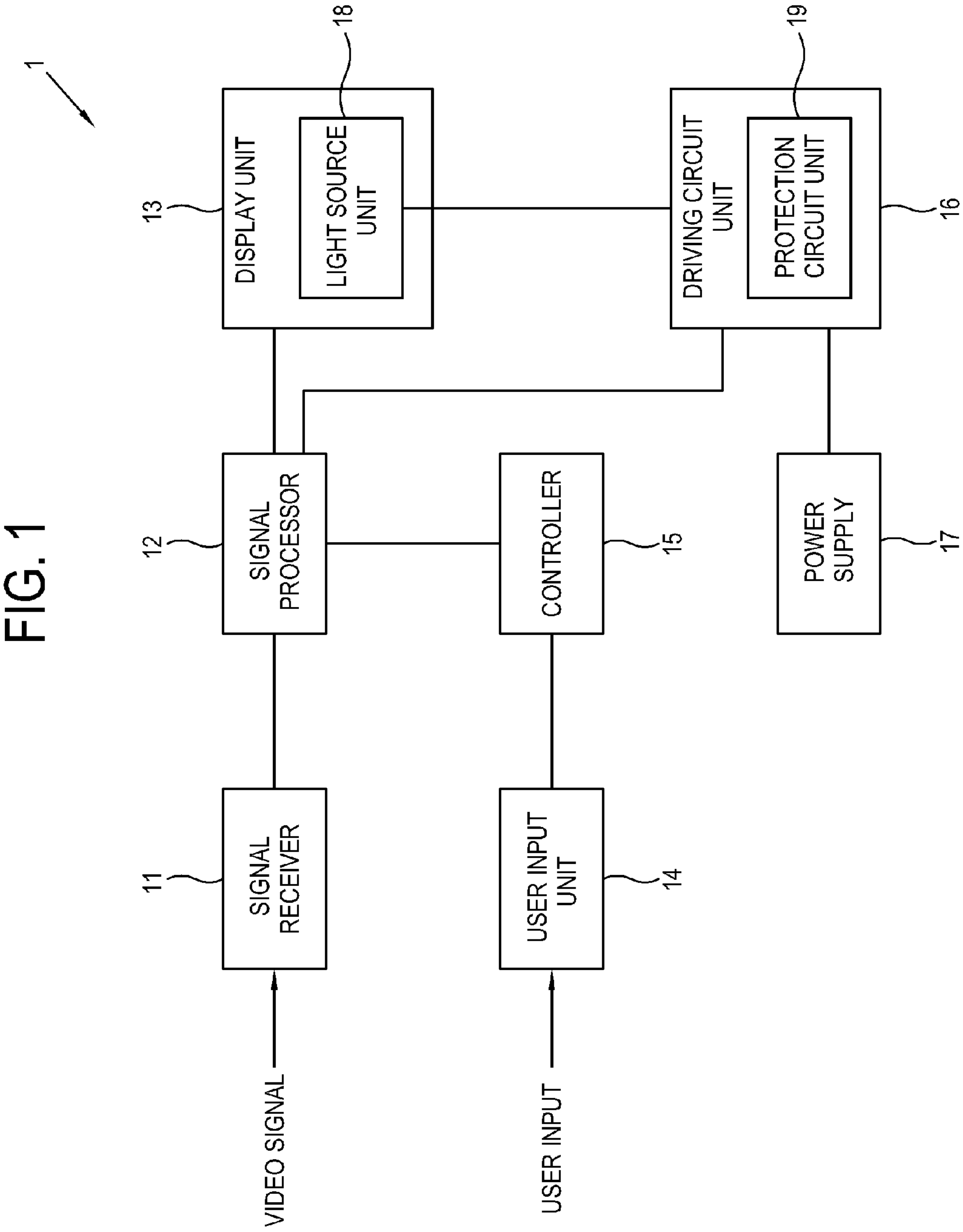
FIG. 1 is a block diagram showing a configuration of a display apparatus according to an exemplary embodiment.

Below, exemplary embodiments will be described in detail with reference to accompanying drawings. FIG. 1 is a block diagram showing a configuration of a display apparatus 1 according to an exemplary embodiment. Display apparatus 1 may be achieved by a television (TV). Display apparatus 1 includes a signal receiver 11, a signal processor 12, a display unit 13, a user input unit 14 and a controller 15.

Signal receiver 11 receives a video signal containing video contents. Also, the video signal may include audio content and/or data contents as well as video content. The video signal received by signal receiver 11 includes a broadcast signal transmitted from a broadcasting station and a signal input from a predetermined video device. In the situation of a broadcast signal, signal receiver 11 may selectively receive a broadcast signal of one channel from among plural channels. The broadcast signal includes all known types of broadcast signals based on airwave broadcasting, cable broadcasting, satellite broadcasting, etc. Also, the kinds of broadcast signals include digital broadcast and analog broadcast. Signal receiver 11 may perform a signal processing to extract video contents, etc., from the received broadcasting signal. Such a signal process includes tuning, analog-digital conversion, demodulation, digital-analog conversion, etc.

In the situation of a video signal received from a video device, signal receiver 11 may communicate with the video device for transmitting a video signal in accordance with characteristics of the received video signal. The communication includes both wired and wireless communication, and both analog and digital communication. The communication method includes all types of communications known, as a communication can be used for transmitting video contents, etc. There is no limit as to the kind of video device that provides a video signal to the signal receiver 11. The video device includes a digital versatile disc (DVD) player, a Bluray disc (BD) player, a personal computer (PC), a mobile phone, a smart phone, a smart pad, etc. Signal receiver 11 may perform signal processing for extracting video contents, etc., from the received video signal. Such a signal process also includes analog-digital conversion, digital-analog conversion, etc.

Further, signal receiver 11 may receive a video signal from a predetermined server through a network, or may receive a video signal from a portable storage device such as a universal serial bus (USB) storage medium. In each situation, the signal receiver may communicate with the other party device, in order to receive a video signal. In either situation, signal receiver 11 may perform an operation for receiving and processing the video signal under the control of controller 15.

Signal processor 12 performs a predetermined video process in order for the video contents extracted from the video signal received by the signal receiver 11 to be displayed. Such a video process includes demultiplexing, decoding, scaling, image quality adjustment, image quality enhancement, etc. Also, signal processor 12 may process an image related to a user interface (UI) menu for a user interface. Signal processor 12 may process an image based on the video contents, etc., and may process an image related to the UI menu so as to be overlapped on one screen or to be displayed in parallel with omitted image.

Display unit 13 displays an image processed by signal processor 12. Although it is not shown, display unit 13 may include a display panel such as an LCD, etc., for displaying an image. As shown in FIG. 1, display unit 13 may include a light source unit 18, which is a so called backlight" for providing light to the display panel. A light guide plate (not shown) guides light output from light source unit 18. Light source unit 18 may be provided, in various forms, in the display apparatus, according to required quantity of light or the size of a screen. For example, the light source unit may be provided as a bar-shaped LED module including a plurality of LEDs (see 29 of FIG. 2) installed in a part of or all of the four sides of a light guide plate.

User input unit 13 receives a user's instruction and may be achieved by a remote controller, a control panel, etc.

Controller 15 controls general operation of display apparatus 1. Controller 15 controls respective elements of display apparatus 1 on the basis of a user's instruction received through user input unit 14. Controller 15 may control signal receiver 11 in order to receive a video signal desired by a user. The controller may control signal processor 12 to perform a predetermined video process for a UI menu and/or video contents extracted from a video signal received by signal receiver 11. As necessary for such control, controller 15 may store data in storage unit 14 or read data from storage unit 14.

Controller 15 may include a non-volatile memory where an execution code of a computer program corresponding to the above control is stored. Controller 15 may also include a volatile memory in which at least a part of the execution code stored in the non-volatile memory is loaded, and a microprocessor for executing the execution code loaded in the volatile memory.

Display apparatus 1 may further include a power supply 17 for supplying power to respective elements, and a driving circuit unit 16 for driving light source unit 18.

Figure 2:
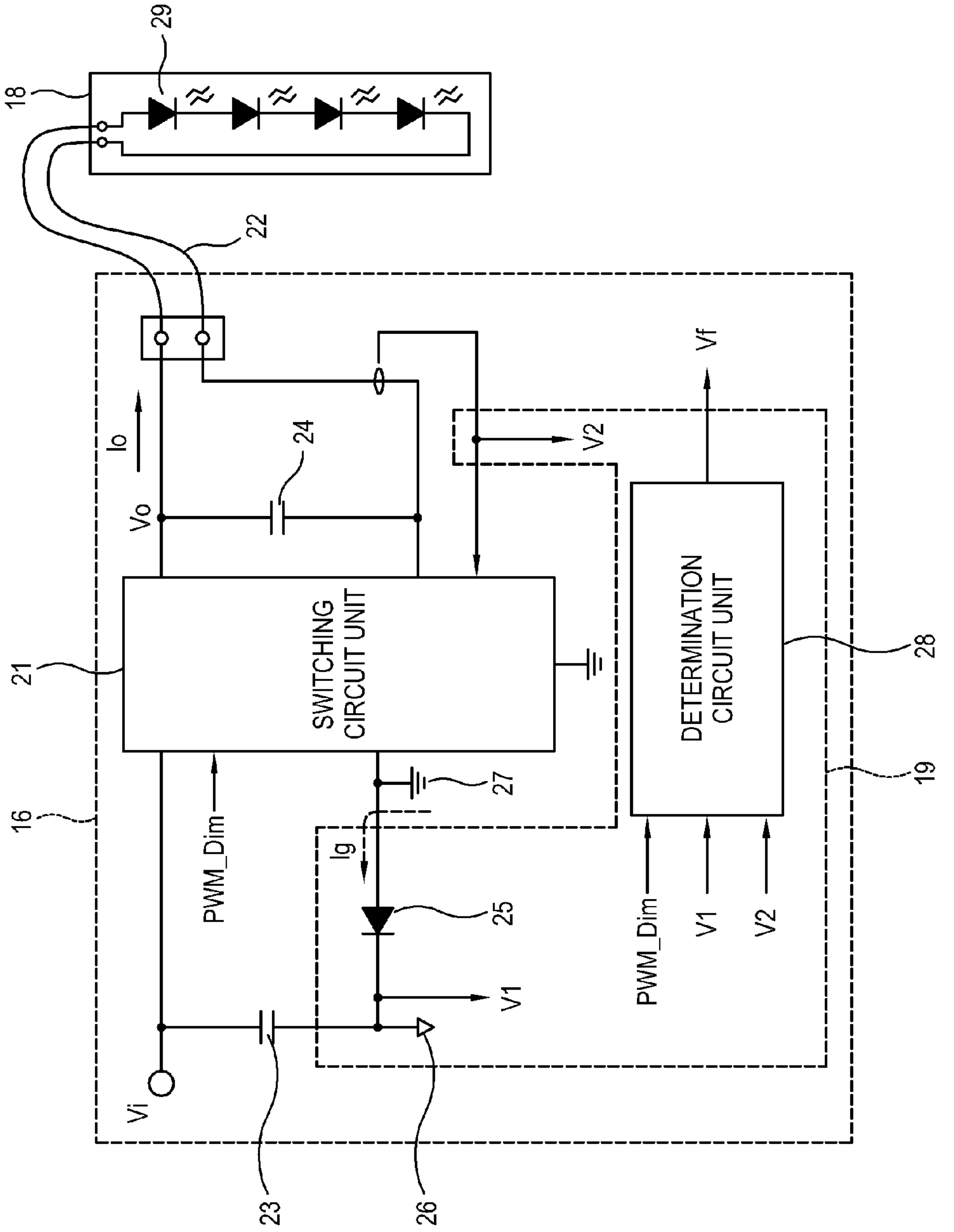
FIG. 2 is a circuit diagram showing a driving circuit unit and a light source unit shown in FIG. 1.

FIG. 2 is a circuit diagram showing driving circuit unit 16 and light source unit 18 shown in FIG. 1. Driving circuit unit 16 and light source unit 18 are connected to each other through a wire 22. Driving circuit unit 16 detects an LED current Io flowing in light source unit 18, and controls the detected LED current Io to reach a predetermined target current level. Driving circuit unit 16 includes capacitors 23 and 24 and a switching circuit unit 21.

Figure 3:
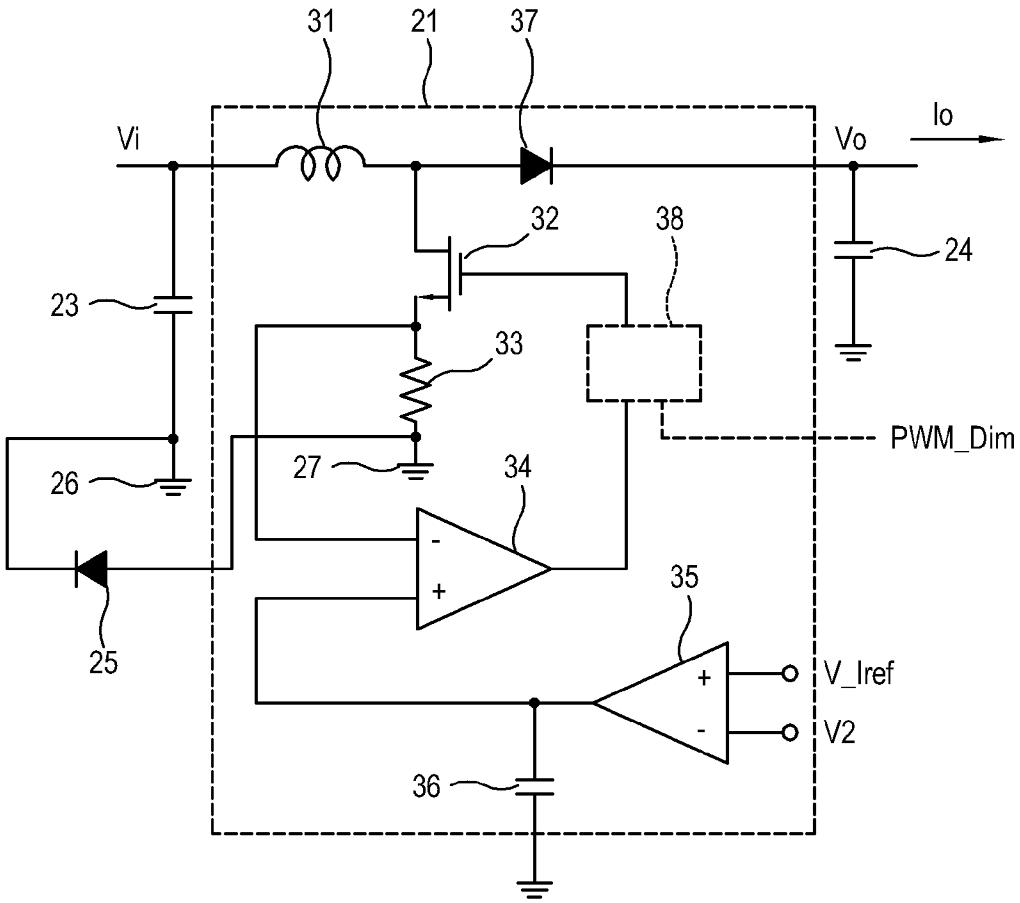
FIG. 3 is a circuit diagram showing an example of a switching circuit unit shown in FIG. 2.

FIG. 3 is a circuit diagram illustrating an example of switching circuit unit 21, shown in FIG. 2. In FIG. 3, some elements shown in FIG. 2 are omitted for convenience. Switching circuit unit 21 may include an inductor 31, a diode 37, a field effect transistor (FET) 32, a resistor 33, a comparator 34, a capacitor 36 and a current amplifier 35.

An input voltage Vi is input by power supply 17 and converted into an output voltage Vo. If FET 32 is turned off, input voltage Vi is supplied to an output side. If FET 32 is turned on, input voltage V1 is not supplied to an output side. A detection voltage V2 corresponding to LED current Io flowing in light source unit 18 is compared with a reference voltage v_Iref of the target current level. If LED current Io is lower than target current level, FET 32 is turned off to increase LED current Io. If LED current Io is higher than the target current level, FET 32 is turned on to decrease LED current Io. Thus, LED current Io follows the target current level.

Meanwhile, driving circuit unit 16 may control the LED current Io in accordance with a video signal. In this exemplary embodiment, driving circuit unit 16 receives a dimming signal PWM_Dim modulated by a pulse width modulation (PWM) method, and drives LED current Io to selectively flow on the basis of the dimming signal PWM_Dim. That is, dimming signal PWM_Dim has an on-section of predetermined duty cycle and an off-section. LED current Io selectively flows in light source unit 18 in accordance with the duty cycle of the dimming signal PWM_Dim. Driving circuit unit 16 may further include a logic gate 38 that receives the dimming signal PWM_Dim as an input. During the on-section of the dimming signal PWM_Dim, FET 32 operates normally as described above, in order to control the LED current Io of the target current level and to cause current Io to substantially flow. During the off-section of the dimming signal PWM_Dim, the FET 32 is turned on to control LED current Io so as not to substantially flow. Alternatively, without logic gate 38, dimming signal PWM_Dim may be reflected in reference voltage V_Iref of the target current level.

Referring back to FIG. 2, driving circuit unit 16 may further include a protection circuit unit 19 for protecting display apparatus 1 from a short circuit. Protection circuit unit 19 may include a detection device 25 and a determination circuit unit 28. Detection device 25 is provided between an input side ground 26 of the driving circuit unit 16 and an output side ground 27, and detects whether a ground path is short-circuited or not. Detection device 26 may be achieved by a diode. Detection device 25 detects the short circuit in the situation where LED current Io does not flow. In this exemplary embodiment, the situation where the LED current Io does not flow may include a situation where dimming signal PWM_Dim is in the off-section. While dimming signal PWM_Dim is in the off-section, if the wire 22, a part of the light source unit 18, etc., is accidentally connected to a ground path (not shown) connected to the output side ground 27 and short-circuited, a ground current Ig may flow. In this situation, a voltage drop is generated between opposite ends of detection device 25 and causes a detection voltage V1 to be changed, so that the short circuit can be detected.

Also, protection circuit unit 19 may detect the short circuit on the basis of detection voltage V2. Detection voltage V2 is used for detecting the short circuit when LED current Io flows normally, i.e., when the dimming signal PWM_Dim is in the on-section. If the detection voltage V2 is abnormally low even though the dimming signal PWM_Dim is in the on-section, it may be determined that LED current Io flows in not a normal path but to a ground path (refer to Ig), i.e., that a short circuit has occurred.

Figure 4:
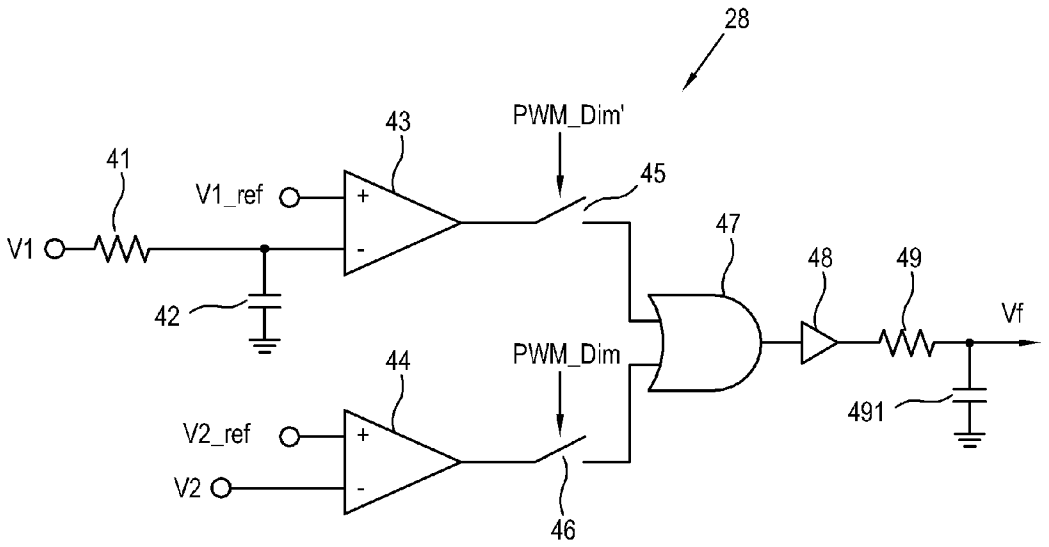
FIG. 4 is a circuit diagram showing a configuration of a determination circuit unit shown in FIG. 2.

FIG. 4 is a circuit diagram showing a configuration of determination circuit unit 28 shown in FIG. 2. Determination circuit unit 28 may include a pair of comparators 43 and 44, a pair of switches 45 and 46, an OR gate 47, and a buffer 48. Also, determination circuit unit 28 may include a first filter configured with a resistor 41 and a capacitor 42, and a second filter configured with a resistor 49 and a capacitor 491 for the purpose of noise removal, signal delay, etc. In FIG. 4, V1_ref and V2_ref are reference voltages of detection voltage V1 and detection voltage V2, respectively. Reference voltage V1_ref may be set as low as −0.2[V] in consideration of the situation where LED current Io does not flow. Reference voltage V2_ref may be set to be a little lower than the reference voltage V_Iref which corresponds to the target level of LED current Io.

Switches 45 and 46 receive control signals PWM_Dim' and PWM_Dim, respectively. Control signal PWM_Dim corresponds to dimming signal PWM_Dim, and control signal PWM_Dim' is a reversal signal of control signal PWM_Dim. Thus, when switch 45 is turned on, switch 46 is turned off. On the other hand, when switch 45 is turned off, switch 46 is turned on. If dimming signal PWM_Dim is in the off-section, switch 45 is turned on to detect the short circuit on the basis of detection voltage V1. If dimming signal PWM_Dim is in off-section, switch 46 is turned on to detect the short circuit on the basis of detection voltage V2.

Detection voltages V1 and V2 are higher than reference voltages V1_ref and V2_ref in a normal situation, but lower than reference voltages V1_ref and V2_ref in an abnormal situation due to the short circuit. Comparators 43 and 44 may output Low when detection voltage V2 is normal, but High when detection voltage V2 is abnormal. In accordance with the outputs of comparators 43 and 44, determination circuit unit 28 outputs an output signal Vf of Low in a normal situation, but outputs a Vf of High in the situation of a short circuit. In response to a determination of a short circuit on the basis of output signal Vf, power supplied from power supply 17 to display apparatus 1 may be shut off (hereinafter, referred to as a "protection operation").

Thus, even though the circuit is short-circuited, the short circuit is immediately detected and thus the power of the display apparatus is shut off, etc., and protection action is performed, thereby enhancing the stability and the reliability of display apparatus 1.

Display apparatus 1 may perform the protection operation in consideration of other abnormal situations of the driving circuit unit 16. To this end, display apparatus 1 may further include a dimming signal output unit.

Figure 5:
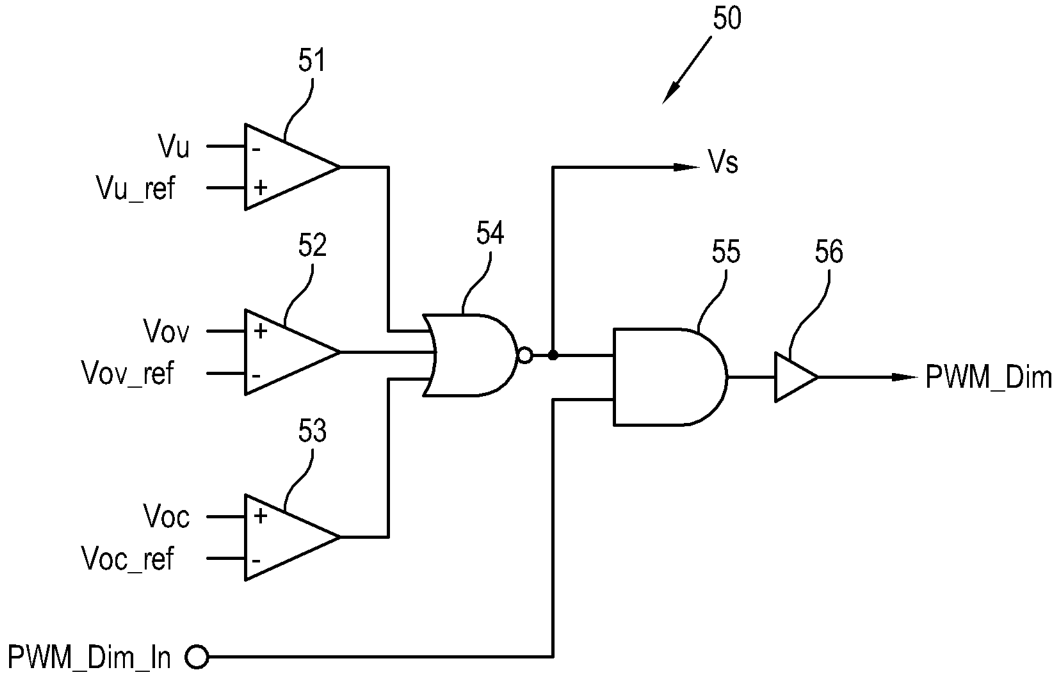
FIG. 5 is a circuit diagram showing a dimming signal output unit according to an exemplary embodiment.

FIG. 5 is a circuit diagram showing a dimming signal output unit 50 according to an exemplary embodiment. Dimming signal output unit 50 outputs a dimming signal PWM_Dim, obtained by reflecting other abnormal situations of driving circuit unit 16 in a dimming signal PWM_Dim_In input by signal processor 12, to protection circuit unit 19.

As shown in FIG. 5, dimming signal output unit 50 may include three comparators 51, 52 and 53 to which a low-voltage detection signal Vu, an overvoltage detection signal Vov and an overcurrent detection signal Voc are respectively input, a NOR gate 54, an AND gate 55, and a buffer 56. For example, low-voltage detection signal Vu, overvoltage detection signal Vov and overcurrent detection signal Voc may be obtained by detecting input voltage Vi, output voltage Vo and LED current lo, respectively. Vu_ref, Vov_ref and Voc_ref are reference voltages of low-voltage detection signal Vu, overvoltage detection signal Vov and overcurrent detection signal Voc, respectively. If any signal among low-voltage detection signal Vu, overvoltage detection signal Vov and overcurrent detection signal Voc is abnormal, the outputs of NOR gate 54 and the AND gate 55 become Low, so that dimming signal PWM_Dim can become Low. Accordingly, if various abnormal situations occur in driving circuit unit 19, protection circuit unit 19 detects the short circuit on the basis of the detection voltage V1, such as in the situation where dimming signal PWM_Dim is in the off-section as described above, and thus performs the protection operation, thereby further enhancing the stability and reliability of display apparatus 1. Meanwhile, the output of NOR gate 54 may be designed as a shut-off signal in order to stop the operation of driving circuit unit 16.

Figure 6:
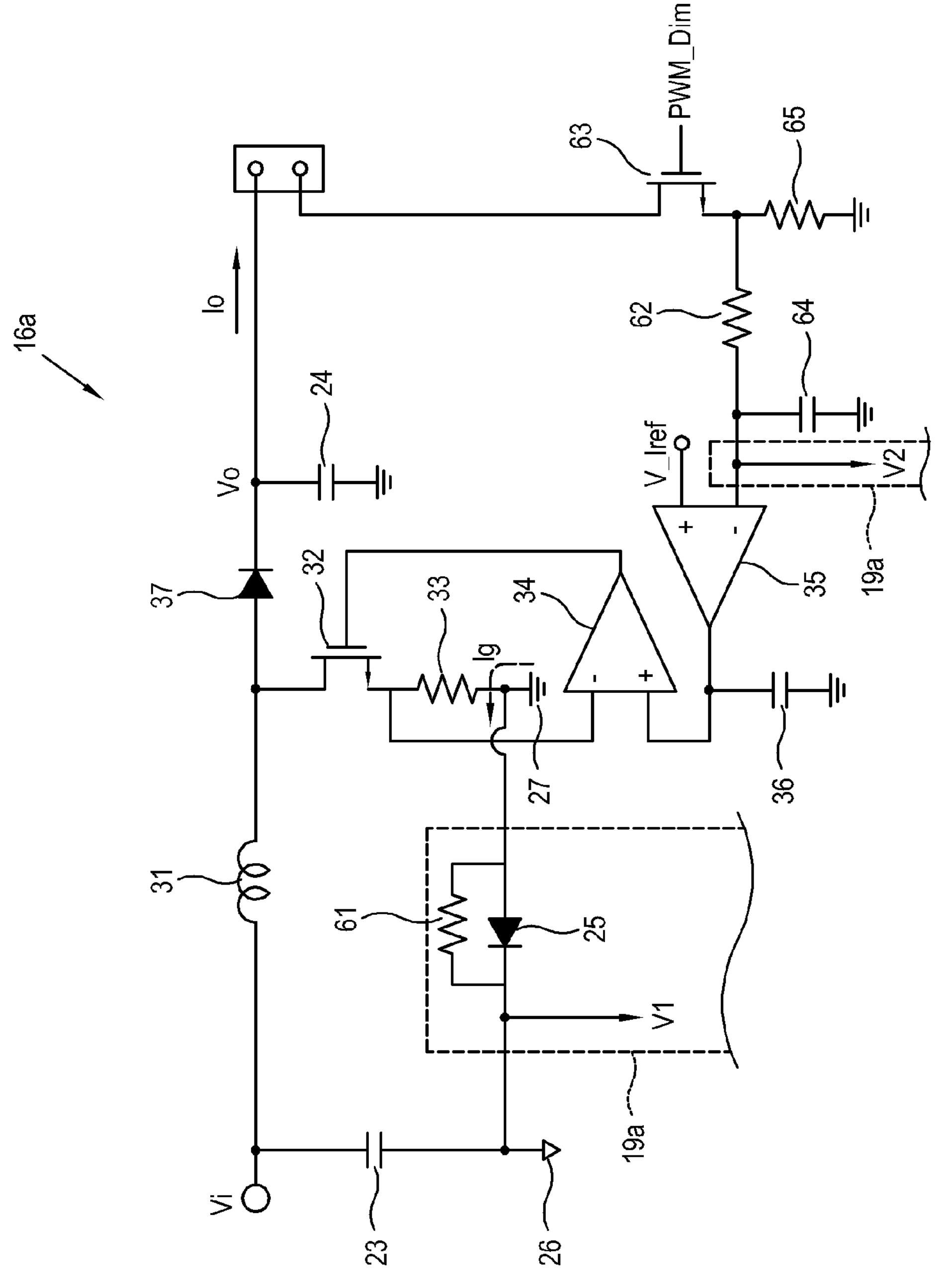
FIGS. 6 to 8 are circuit diagrams showing a driving circuit unit according to other exemplary embodiments.

FIG. 6 is a circuit diagram showing a driving circuit unit 16*a* according to another exemplary embodiment. Driving circuit unit 16*a* includes a protection circuit unit 19*a*. Regarding driving circuit unit 16*a* and protection circuit unit 19*a* of FIG. 6, repetitive descriptions of the same or similar configurations such as driving circuit unit 16 and protection circuit unit 19, described with reference to FIGS. 1 to 5, will be avoided. Protection circuit unit 19*a* further includes a resistor 61. Resistor 61 is connected in parallel with detection device 25, and protects detection device 25 from voltage applied when the driving circuit unit 16*a* stops operating. Resistor 61 is an exemplary embodiment of a protection device. Also, protection circuit unit 19*a* further includes an FET 63, which forcibly connects/disconnects the path of LED current Io on the basis of dimming signal PWM_Dim, thereby enhancing response characteristics of the driving circuit unit 16*a*. Also, protection circuit unit 19*a* additionally includes a resistor 65 for detecting LED current Io, as well as a resistor 62 and a capacitor 64 for noise removal, etc.

Figure 7:
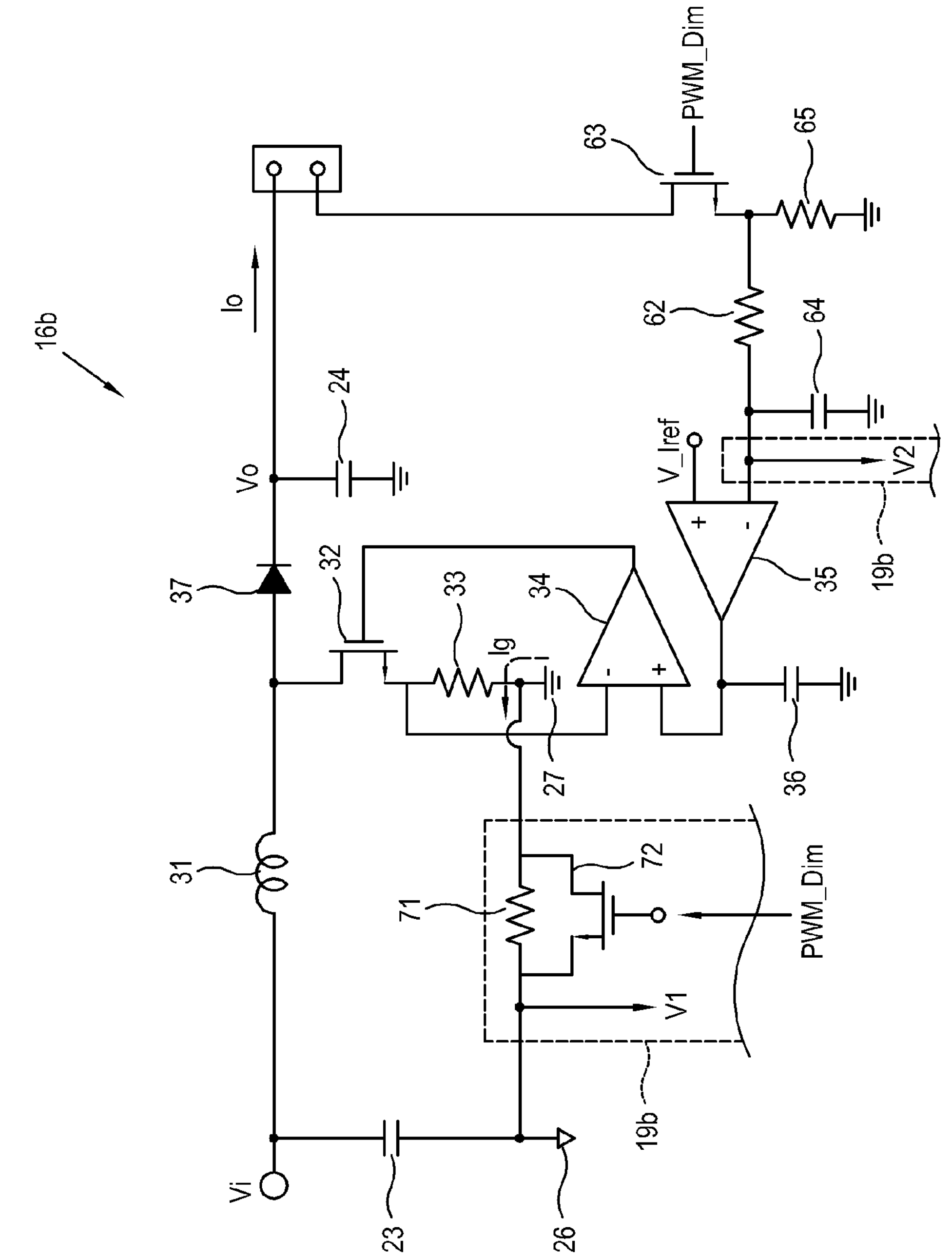

FIG. 7 is a circuit diagram showing a driving circuit unit 16*b* according to still another exemplary embodiment. Driving circuit unit 16*b* includes a protection circuit unit 19*b*. With regard to driving circuit unit 16*b* and protection circuit unit 19*b* of FIG. 7, repetitive descriptions of the same or similar configurations as the driving circuit units 16 and 16*a*, and the protection circuit units 19 and 19*a* described with reference to FIGS. 1 to 6 will be avoided. Protection circuit unit 19*b* further includes a detection device 71 and a switch 72. Detection device 71 is achieved by a resistor. Switch 72 is connected in parallel with detection device 71, and turned on/off on the basis of dimming signal PWM_Dim. While the dimming signal PWM_Dim is in the on-section, switch 72 is turned on so as not to make an electric current flow in detection device 71. While dimming signal PWM_Dim is in the off-section, switch 72 is turned off so as to make electric current flow in detection device 71. That is, when dimming signal PWM_Dim is in the on-section, the electric current does not wastefully flow in detection device 71, thereby minimizing power consumption.

Figure 8:
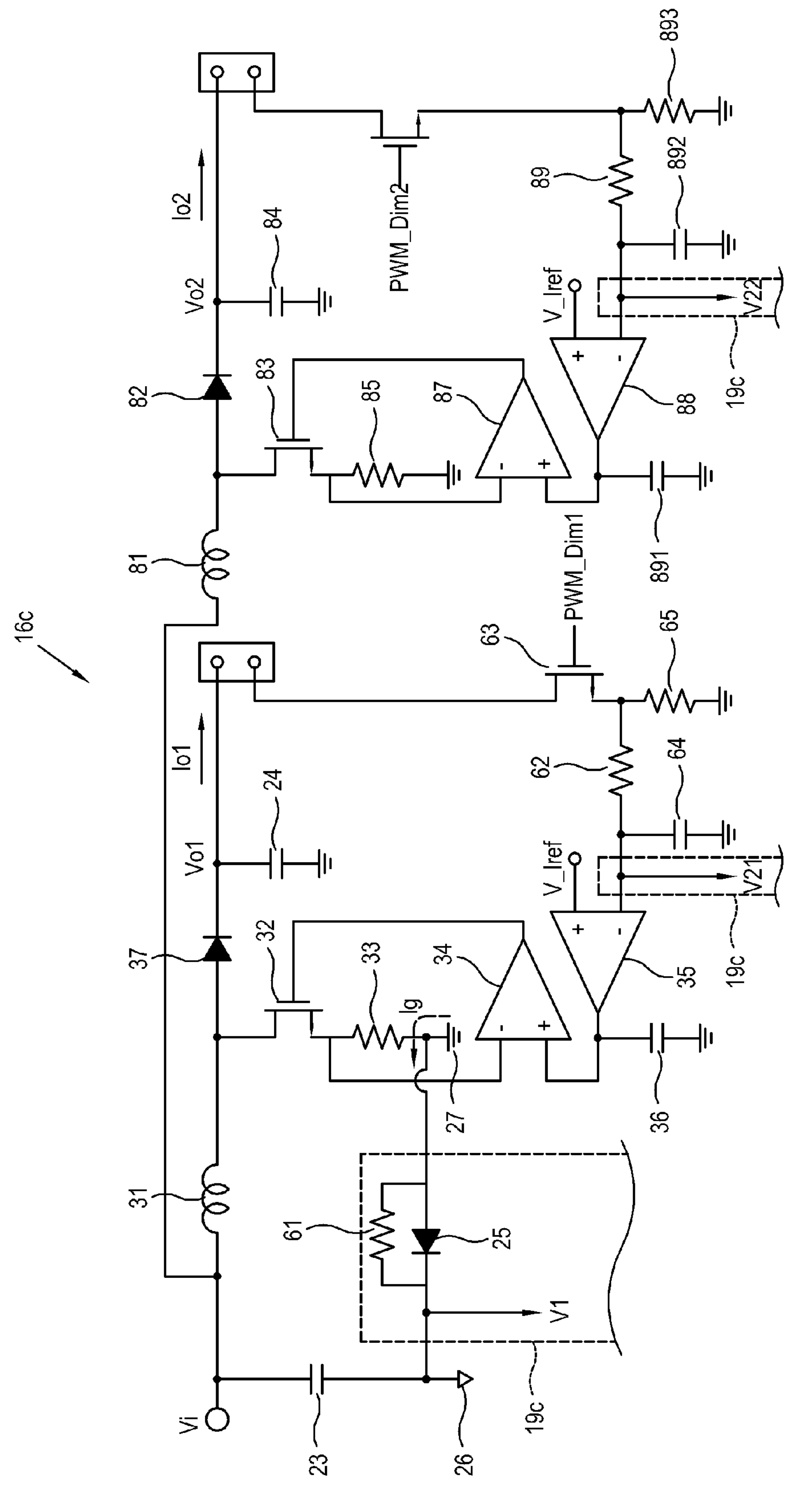

FIG. 8 is a circuit diagram showing a driving circuit unit 16*c*, according to another exemplary embodiment. Driving circuit unit 16*c* includes a protection circuit unit 19*c*. With regard to driving circuit unit 16*c* and protection circuit unit 19*c* of FIG. 7, repetitive descriptions of the same or similar configurations as driving circuit units 16, 16*a* and 16*b*, and protection circuit units 19, 19*a* and 19*b* described with reference to FIGS. 1 to 7, will be avoided. Driving circuit unit 16*c* drives two light source units (refer to '18') independently of each other. Driving circuit unit 16*c* further includes an inductor 81, a diode 82, an FET 83, a capacitor 84, a resistor 85, an FET 86, a comparator 87, a current amplifier 88, a capacitor 891, a resistor 89, a capacitor 892, and a resistor 893. Output voltage Vo1, LED current Io1 the dimming signal PWM_Dim1, as well as output voltage V02, LED current Io2 and dimming signal PWM_Dim2, correspond to the two light source units (refer to '18'), respectively.

Figure 9:
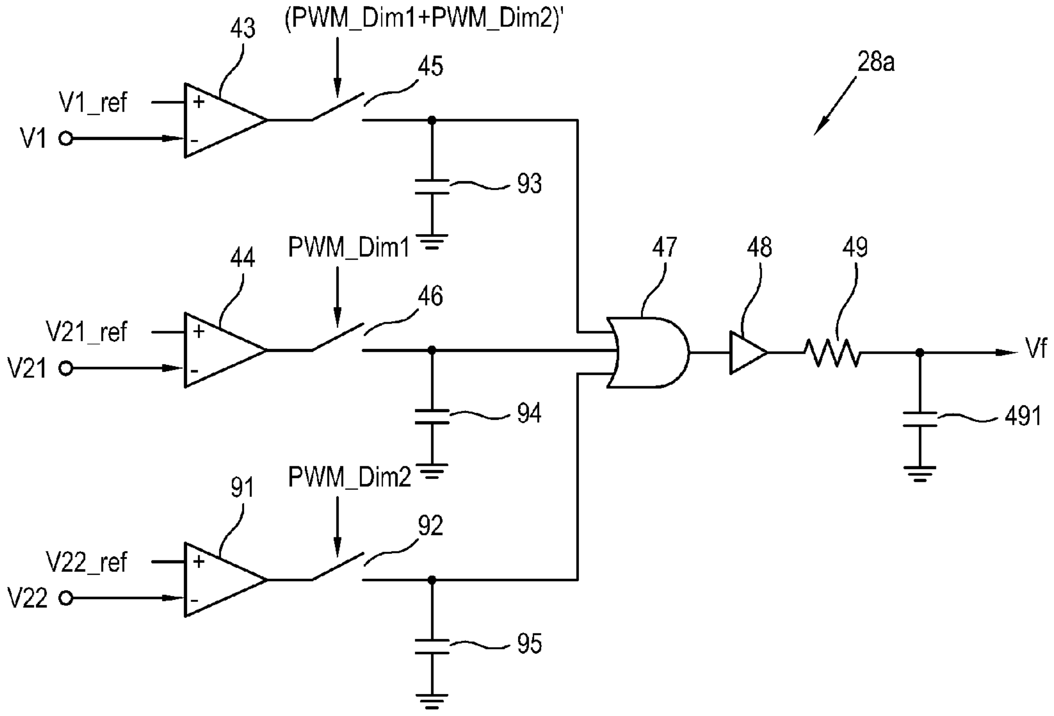
FIG. 9 is a circuit diagram showing a determination circuit unit of a protection circuit unit shown in FIG. 8.

Protection circuit unit 19*c* senses two detection voltages V21 and V22 corresponding to two light source units (refer to '18'). FIG. 9 is a circuit diagram showing a determination circuit unit 28*a* of protection circuit unit 19*c*. With regard to determination circuit unit 28*a* of FIG. 9, repetitive descriptions of the same or similar configurations as determination circuit unit 28 described with reference to FIG. 4, will be avoided. Comparator 44, switch 46, comparator 91 and switch 92 correspond to the two light source units (refer to '18'), respectively. Switch 45 is turned on/off by a signal reverse to a logical sum of the dimming signal PWM_Dim1 and the dimming signal PWM_Dim2. Determination circuit unit 28*a* may further include capacitors 93, 94 and 95, respectively, connected to three switches 45, 46 and 95.

Figure 10:
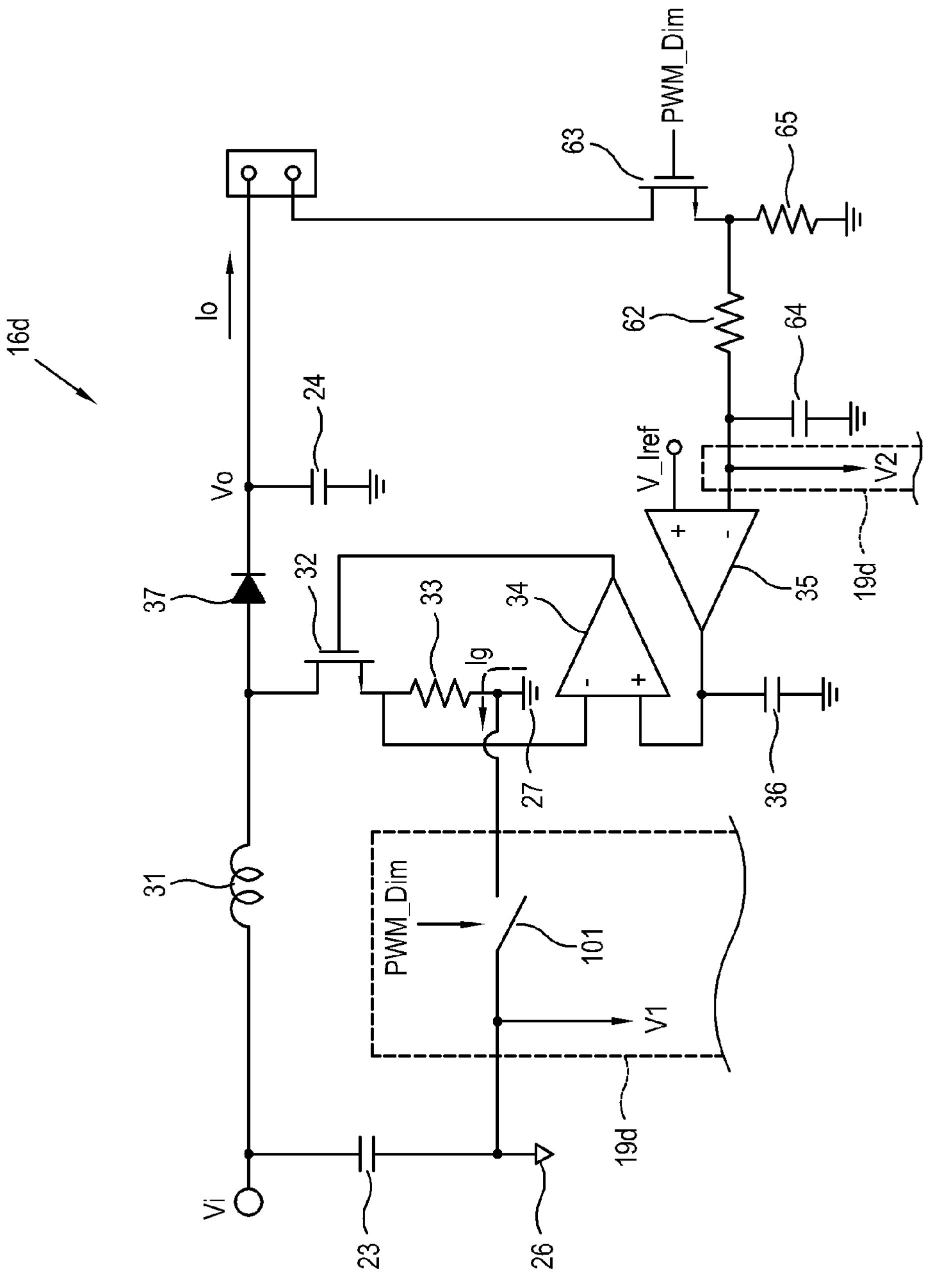
FIG. 10 is a circuit diagram showing a driving circuit unit according to still another exemplary embodiment.

FIG. 10 is a circuit diagram showing a driving circuit unit 16*d* according to still another exemplary embodiment. Driving circuit unit 16*d* includes a protection circuit unit 19*d*. With regard to driving circuit unit 16*d* and protection circuit unit 19*d* of FIG. 10, repetitive descriptions of the same or similar configurations as driving circuit units 16, 16*a*, 16*b* and 16*c* and protection circuit units 19, 19*a*, 19*b* and 19*c* described with reference to FIGS. 1 to 9 will be avoided. Protection circuit unit 19*d* includes a switch 101 connected between an input side ground 26 and an output side ground 27. Switch 101 is turned on/off on the basis of dimming signal PWM_Dim. While dimming signal PWM_Dim is in the on-section, switch 101 is turned on. While dimming signal PWM_Dim is in the off-section, switch 101 is turned off. Thus, when dimming signal PWM_Dim is in the off-section, ground current Ig is prevented from flowing so that the circuit can be protected from a short circuit.

Figure 11:
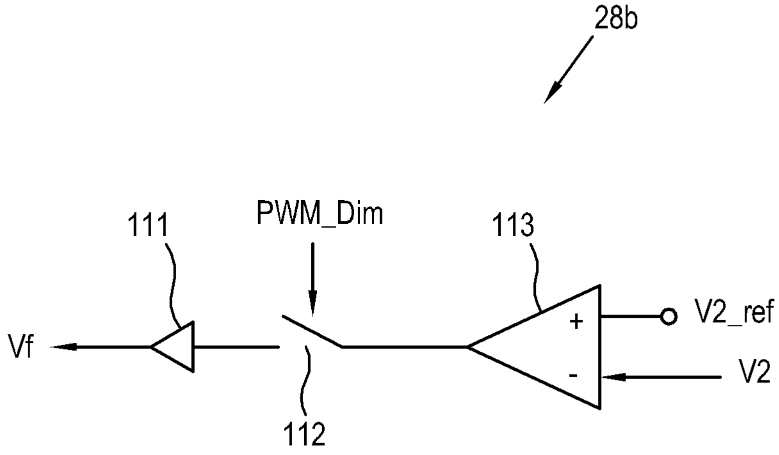
FIG. 11 is a circuit diagram showing a determination circuit unit of a protection circuit unit shown in FIG. 10.

FIG. 11 is a circuit diagram showing determination circuit unit 28*b* of protection circuit unit 19*d*, shown in FIG. 10. With regard to determination circuit unit 28*b* of FIG. 11, repetitive descriptions of the same or similar configurations as determination circuit units 28 and 28*a* described with reference to FIGS. 4 to 9, will be avoided. Determination circuit unit 28*b* includes a comparator 113, a switch 112 and a buffer 111. Switch 112 is turned on/off by a dimming signal PWM_Dim. As a result, detection voltage V2 being abnormally low during the on-section of the dimming signal PWM_Dim, an output signal Vf is output from determination circuit 286.

Figure 12:
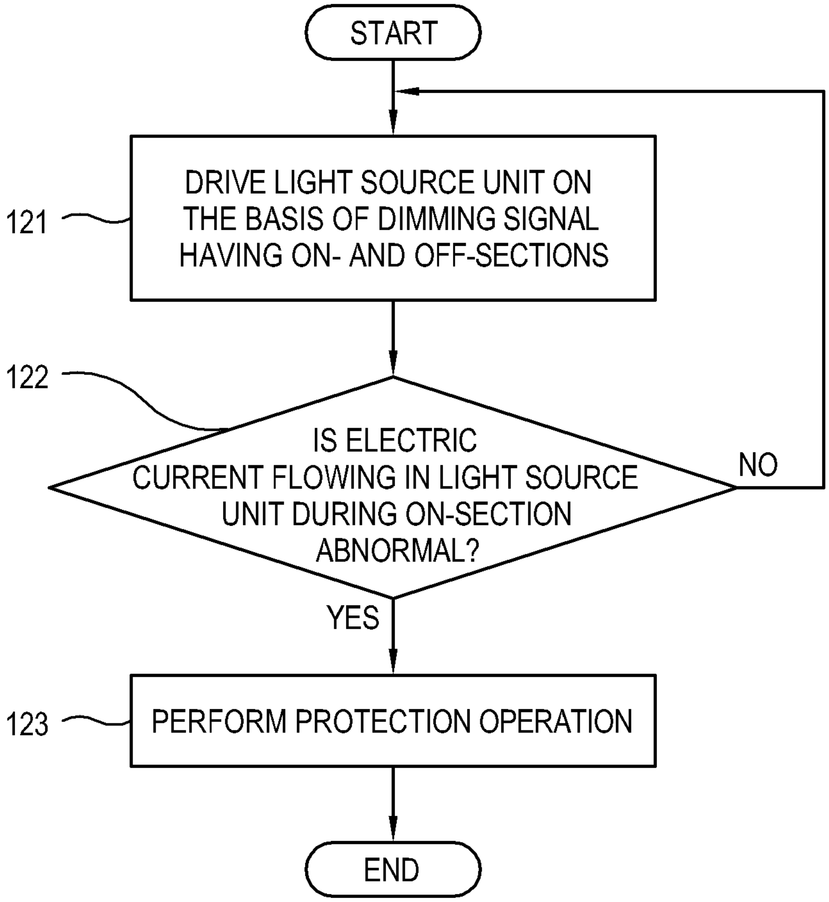
FIGS. 12 and 13 are flowcharts showing a control method of the display apparatus according to an exemplary embodiment.

FIG. 12 is a flowchart showing a control method of display apparatus 1, according to an exemplary embodiment. At operation 121, light source unit 18 is driven on the basis of dimming signal PWM_Dim having both an on-section and an off-section. At operation 122, it is determined whether LED current Io flowing in light source unit 18 is abnormal during the off-section of dimming signal PWM_Dim. Whether LED current Io flowing in light source unit 18 is abnormal may be determined on the basis of detection voltage V1. As a result of LED current Io being abnormal, the protection operation is performed at operation 123. In parallel with operation 122, it may further be determined whether the electric current flowing in driving circuit unit 19 is abnormal during the on-section of dimming signal PWM_Dim. Whether the electric current flowing in driving circuit unit 19 is abnormal may be determined on the basis of detection voltage V2.

Figure 13:
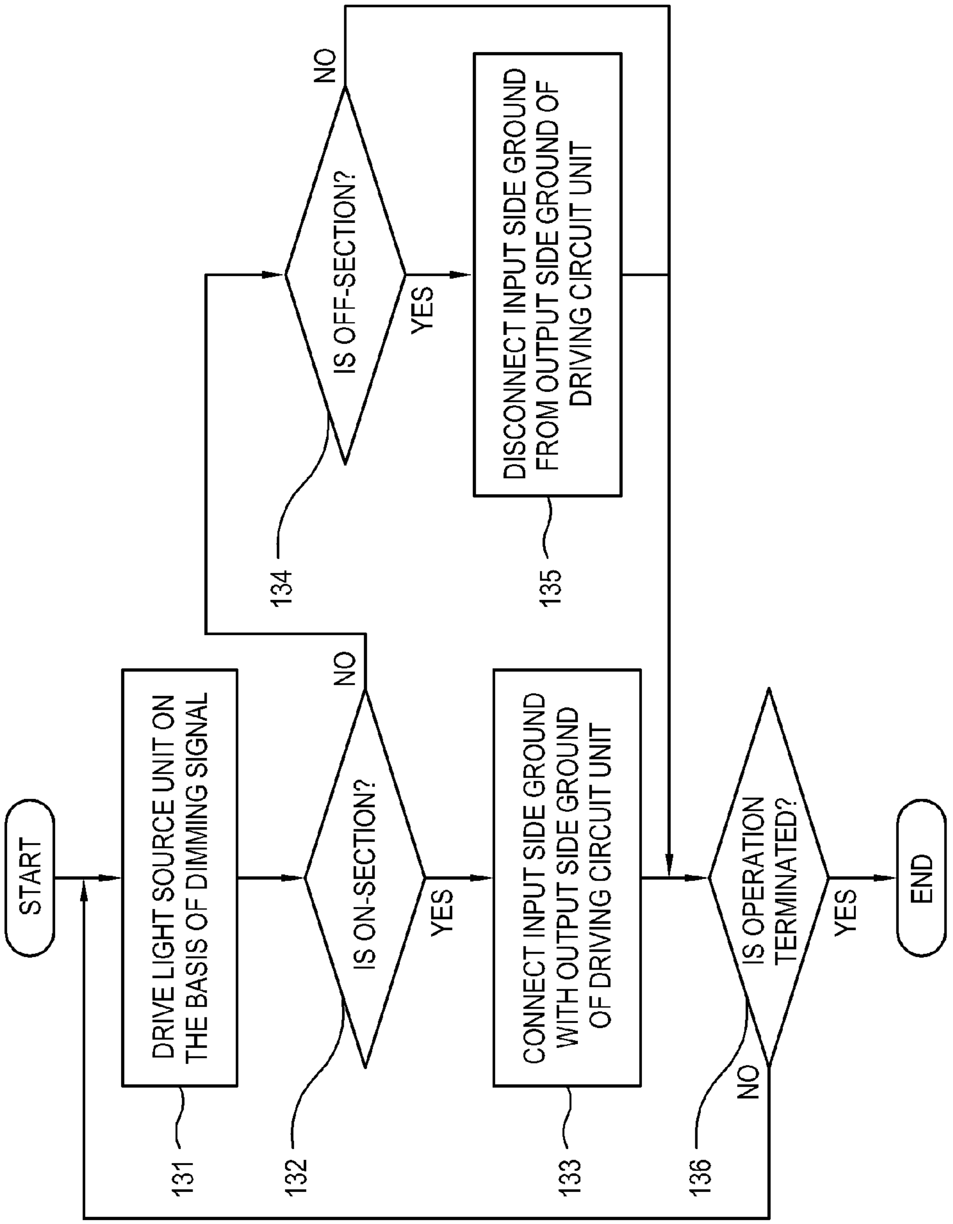

FIG. 13 is a flowchart showing a control method of display apparatus 1 according to another exemplary embodiment. At operation 131, light source unit 18 is driven on the basis of the dimming signal PWM_Dim. As a result of dimming signal PWM_Dim being in the on-section at operation 132, input side ground 26 and output side ground 27 of driving circuit unit 19*d* are connected at operation 133. If dimming signal PWM_Dim is in the off-section at operation 134, input side ground 26 and output side ground 27 of the driving circuit unit 19*d* are disconnected at operation 135. At operation 136, it is determined whether to end the operation, thereby returning to operation 131 or ending the operation.

As described above, according to an exemplary embodiment, the display apparatus is protected when a short-circuit occurs in the driving circuit, thereby enhancing the stability and reliability of the apparatus.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:

a signal processor which processes a video signal;

a display which displays an image based on the video signal processed by the signal processor, the display including a light source providing light for displaying the image; and a driving circuit which drives the light source on the basis of a dimming signal having an on-section and an off-section for dimming the light source, wherein the driving circuit includes:

a protection circuit for performing a protection operation as a result of an abnormal electric current flowing in the driving circuit, during the off-section or the on-section; and, a determination circuit unit which compares one of a voltage of an input side ground and a feedback voltage of an output side with a corresponding reference voltage, and controls the protection circuit to perform the protection operation in response to one of the voltage of the input side ground and the feedback voltage of the output side being outside bounds of the corresponding reference voltage, wherein the protection circuit comprises a circuit device which connects the input side ground and an output side ground of the driving circuit during the on-section, and disconnects the input side ground and the output side ground of the driving circuit during the off-section, wherein the circuit device comprises a first end and a second end which are directly connected to the input side ground and the output side ground of the driving circuit, respectively, and wherein the protection circuit includes:

a detection device which is connected between the input side ground and the output side ground of the driving circuit and detects an electric current flowing in the light source; and a protection device which is connected in parallel to the detection device and protects the detection device from voltage applied when the driving circuit stops operating, wherein the determination circuit unit includes:

a pair of comparators;

a first switch which receives a control signal corresponding to the dimming signal which is turned on to detect a short circuit based on the voltage of the input side ground if the dimming signal is in the on-section; and a second switch which receives a reversal signal of the control signal and which is turned on to detect short circuit based on the feedback voltage of the output side ground if the dimming signal is in the off-section.

2. The display apparatus according to claim 1, wherein the detection device is a diode.

3. The display apparatus according to claim 1, wherein the detection device comprises a resistor.

4. The display apparatus according to claim 1, wherein the protection circuit further comprises a switching device connected in parallel to the detection device and is switched in order to not make an electric current flow in the detection device during the on-section.

5. The display apparatus according to claim 1, further comprising:

a dimming signal output device which outputs the dimming signal on the basis of at least one detection signal for detecting overvoltage/overcurrent situations of the driving circuit.

6. The display apparatus according to claim 1, wherein the protection operation comprises shutting off the power of the display apparatus.

7. A method of controlling a display apparatus comprising a light source providing light for displaying an image, the method comprising:

by a driving circuit, driving the light source on the basis of a dimming signal having an on-section and an off-section for dimming the light source;

by a protection circuit, performing a protection operation as a result of an abnormal electric current flowing in the driving circuit during the off-section or the on-section;

by a determination circuit unit, comparing one of a voltage of an input side ground and a feedback voltage of an output side with a corresponding reference voltage, and controlling the protection circuit to perform the protection operation in response to one of the voltage of the input side ground and the feedback voltage of the output side being outside bounds of the corresponding reference voltage; and by the protection circuit, connecting the input side ground and an output side ground of the driving circuit for driving the light source during the on-section, and disconnecting the input side ground and the output side ground of the circuit during the off-section, wherein the protection circuit comprises a circuit device, and wherein the circuit device comprises a first end and a second end which are directly connected to the input side ground and the output side ground of the driving circuit, respectively, wherein the protection circuit includes:

a detection device which is connected between the input side ground and the output side ground of the driving circuit and detects an electric current flowing in the light source; and a protection device connected in parallel to the detection device and protects the detection device from voltage applied when the driving circuit stops operating, wherein the determination circuit unit includes:

a pair of comparators;

a first switch which receives a control signal corresponding to the dimming signal which is turned on to detect a short circuit based on the voltage of the input side ground if the dimming signal is in the on-section; and a second switch which receives a reversal signal of the control signal and which is turned on to detect short circuit based on the feedback voltage of the output side ground if the dimming signal is in the off-section.

8. The method according to claim 7, wherein the performing of the protection operation includes switching so as not to make an electric current flow in a resistor for detecting an electric current flowing in the detection device, during the on-section.

9. The method according to claim 7, further comprising outputting the dimming signal on the basis of at least one detection signal for detecting overvoltage/overcurrent situations of a circuit for driving the light source.

10. A display apparatus comprising:

a signal processor which processes a video signal;

a display which displays an image based on the video signal processed by the signal processor, and comprises a light source providing light for displaying the image;

a driving circuit which drives the light source unit on the basis of a dimming signal having an on-section and an off-section for dimming the light source;

a protection circuit including a circuit device which connects an input side ground and an output side ground of the driving circuit during the on-section, and disconnects the input side ground and the output side ground of the driving circuit during the off-section; and a determination circuit unit which compares one of a voltage of the input side ground and a feedback voltage of an output side with a corresponding reference voltage, and controls the protection circuit to perform the protection operation in response to one of the voltage of the input side ground and the feedback voltage of the output side being outside bounds of the corresponding reference voltage, wherein the circuit device comprises a first end and a second end which are directly connected to the input side ground and the output side ground of the driving circuit, respectively, wherein the protection circuit includes:

a detection device which is connected between the input side ground and the output side ground of the driving circuit and detects an electric current flowing in the light source; and a protection device which connected in parallel to the detection device and protects the detection device from voltage applied when the driving circuit stops operating, wherein the determination circuit unit includes:

a pair of comparators;

a first switch which receives a control signal corresponding to the dimming signal which is turned on to detect a short circuit based on the voltage of the input side ground if the dimming signal is in the on-section; and a second switch which receives a reversal signal of the control signal and which is turned on to detect short circuit based on the feedback voltage of the output side ground if the dimming signal is in the off-section.

11. The display apparatus according to claim 10, wherein the protection circuit performs a protection operation as a result of an abnormal electric current flowing in the driving circuit during the on-section.

12. The display apparatus according to claim 10, further comprising a dimming signal output device which outputs the dimming signal on the basis of at least one detection signal for detecting overvoltage/overcurrent situations of the driving circuit.

13. A method of controlling a display apparatus comprising a light source providing light for displaying an image, the method comprising:

by a driving circuit, driving the light source on the basis of a dimming signal having an on-section and an off-section for dimming the light source;

by a determination circuit unit, comparing one of a voltage of an input side ground and a feedback voltage of an output side with a corresponding reference voltage, and controlling the protection circuit to perform the protection operation in response to one of the voltage of the input side ground and the feedback voltage of the output side being outside bounds of the corresponding reference voltage; and by a protection circuit, connecting the input side ground and an output side ground of the driving circuit for driving the light source during the on-section, and disconnecting the input side ground and the output side ground of the circuit during the off-section, wherein the protection circuit comprises a circuit device, and wherein the circuit device comprises a first end and a second end which are directly connected to the input side ground and the output side ground of the driving circuit, respectively, wherein the protection circuit includes:

a detection device which is connected between the input side ground and the output side ground of the driving circuit and detects an electric current flowing in the light source;

a protection device which is connected in parallel to the detection device and protects the detection device from voltage applied when the driving circuit stops operating, wherein the determination circuit unit includes:

a pair of comparators;

a first switch which receives a control signal corresponding to the dimming signal which is turned on to detect a short circuit based on the voltage of the input side ground if the dimming signal is in the on-section; and a second switch which receives a reversal signal of the control signal and which is turned on to detect short circuit based on the feedback voltage of the output side ground if the dimming signal is in the off-section.

14. The method according to claim 13, further comprising outputting the dimming signal on the basis of at least one detection signal for detecting overvoltage/overcurrent situations of the circuit for driving the light source.

15. The method according to claim 13, further comprising performing a protecting operation as a result of an abnormal electric current flowing in the circuit during the on-section.

* * * * *